Aug. 2, 1960  E. L. WATELET  2,947,921
FINE GRID PERMANENT MAGNETIC CHUCK
Filed Feb. 25, 1957
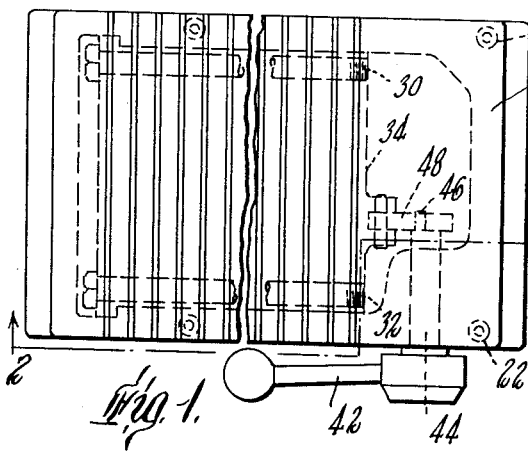
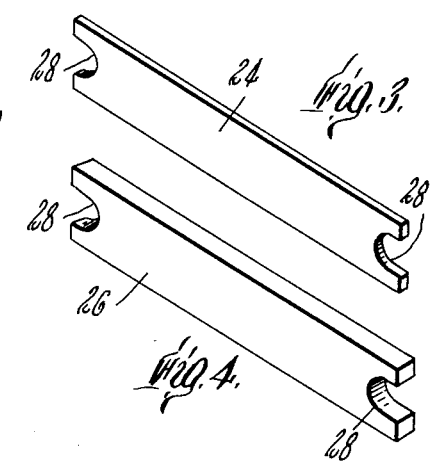
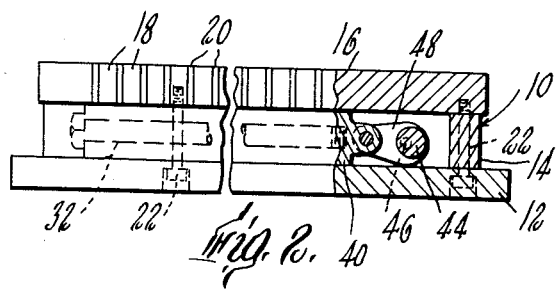
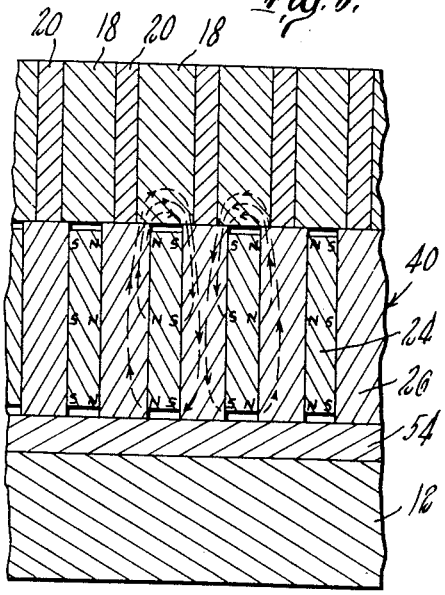
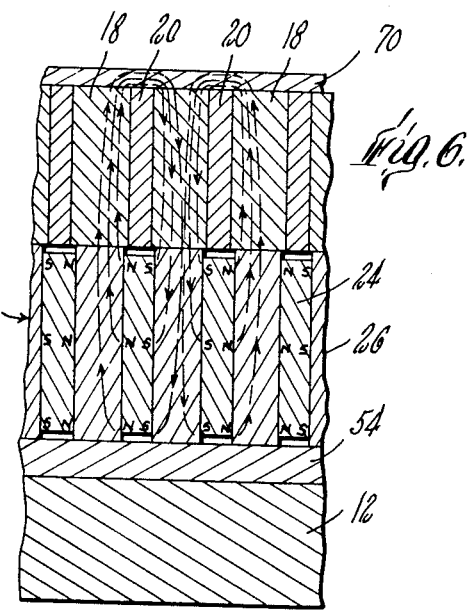
Inventor
Armand L. Watelet
by Maxwell Frost
Atty.

United States Patent Office 2,947,921
Patented Aug. 2, 1960

2,947,921
FINE GRID PERMANENT MAGNETIC CHUCK

Ermand L. Watelet, Warwick, R.I., assignor to Brown & Sharpe Mfg. Co., Providence, R.I., a corporation of Rhode Island Filed Feb. 25, 1957, Ser. No. 642,111

1 Claim. (Cl. 317—159)

The present invention relates to an improved permanent magnetic chuck.

Heretofore it has been considered impracticable in the manufacture of permanent magnetic chucks to produce what is generally referred to as a fine mesh work face. The number of pole pieces in the work face correspond in number and generally in their spacing to the positions of the cooperating magnets of a magnet pack mounted within the chuck body. In order that the permanent magnetic chuck may generate a holding force which will be sufficient to hold work pieces for ordinary machining and grinding operations, it has been found necessary to utilize permanent magnets having a pole axis of substantial length and a cross sectional area sufficient to generate a massive flow of magnetic flux through the work piece. Such magnets may be an inch or more in length and will have a cross sectional area including a dimension lengthwise of the chuck face of as much as $\frac{1}{2}''$ to $\frac{3}{4}''$. Coarse face magnetic chucks of this general description have been found poorly adapted for the holding of thin work pieces for the reason that the holding force exerted by the chuck is in any case limited by the number of lines of force which can be circuited from one pole piece of the chuck to the next through the work piece. Thin work pieces provide a limited cross sectional area through which only a relatively few lines of force can pass which results in a serious loss of holding power.

It is understood that electro-magnetic chucks having a relatively large number of small flux carrying or magnetic poles adapted to provide a relatively large number of small flux circuits have been successfully employed for the holding of thin work. Difficulty has been encountered, however, where attempts have been made to utilize permanent magnet chucks in this manner for the reason that a relatively small number of lines of flux only per unit of area can be generated or transmitted through permanent magnet material.

It is a principal object of the present invention to provide an efficient permanent magnetic chuck having a relatively fine mesh work holding surface in which a large number of small flux circuits generated by a correspondingly grouped number of permanent magnets each occupying relatively small space lengthwise of the chuck is well adapted to produce a large number of small flux holding circuits which are of maximum intensity and which in the aggregate provide a powerful holding force well adapted for holding thin work.

More specifically, it is an object of the invention to provide a fine mesh permanent magnetic chuck of the general type set forth which is particularly well adapted for the effective holding of thin work which may range from $\frac{1}{32}''$ to a few thousandths of an inch in thickness.

With these and other objects in view as may hereinafter appear a feature of the invention consists in the provision of a magnet pack in which thin magnets which may be no more than $\frac{1}{8}''$ in thickness are employed, which are magnetized across the narrow dimension. Adjacent magnets of the magnet pack have opposite polarity and are spaced from one another by magnetic inserts, so that adjacent faces of any two magnets and the intervening magnetic insert will be of one polarity, and the next magnetic insert together with the faces of magnets adjacent thereto will be of the opposite polarity.

Further in accordance with the invention the magnet pack above described is arranged to cooperate with a chuck work holding plate which may, for example, be built up of a series of pole pieces in the form of transversely extending bars of low carbon steel separated from one another by non-magnetic inserts of brass with non-magnetic end sections which may be of brass or aluminum. It will be understood that, while the non-magnetic elements of the chuck are herein described as being composed preferably of brass or aluminum, any other suitable non-magnetic material may be used in place thereof as desired.

The permanent magnetic work holding plate and the magnet pack above described are arranged to be relatively shiftable in the lengthwise direction to cause the magnetic flux generated by the permanent magnets alternatively to be carried up through the pole pieces of the work holding plate and the work, and alternatively to be short-circuited through the pole pieces of the chuck work holding plate and thereby to release the work on the chuck.

With the above and other objects in view as may hereinafter appear the several features of the invention consist also in the devices, combinations and arrangement of parts hereinafter described and claimed which, together with the advantages to be obtained thereby, will be readily understood by one skilled in the art from the following description taken in connection with the accompanying drawings in which:

Fig. 1 is a plan view of a permanent magnetic chuck embodying therein the several features of the invention, the center portion of the chuck having been broken away;

Fig. 2 is a sectional view taken on a line 2—2 of Fig. 1 illustrating particularly the relationship of the magnetic work holding plate of the chuck and the mechanism for shifting the magnetic pack in order to shift the chuck between On and Off positions;

Fig. 3 is a perspective view of one of the permanent magnets employed in the manufacture of applicant's improved chuck;

Fig. 4 is a perspective view of one of the pole pieces which are disposed in alternating position with the magnets in the magnet pack;

Fig. 5 is a sectional view on a large scale of a portion of the magnet pack and chuck work supporting plate assembly illustrating particularly the magnet pack in the Off or work release position with relation to the chuck work holding plate, and Fig. 6 is a view similar to Fig. 5 but with the magnet pack moved to the alternate On position in which the magnetic flux flows from the individual magnet up through the adjacent pole pieces through the work and down through the pole pieces to the magnet on the other side.

The permanent magnet chuck herein disclosed as embodying in a preferred form the several features of the invention consists of a casing 10 of which the base 12 and a casting forming the side walls 14 are formed preferably of aluminum, and a work holding plate 16 which consists of two aluminum end pieces and a series of bar-shaped low carbon steel pole pieces 18 separated by similarly shaped brass spacers 20. The end pieces, pole pieces and spacers forming the top plate 16 are soldered together into a solid plate which is machined to provide the necessary smooth surfaces and is bolted to the side wall casting 14 and base 12 by means of bolts 22 located at spaced intervals about the edge of the chuck.

Beneath the work supporting plate 16 there is provided a magnet pack which is comprised of thin rectangular magnets 24 which are separated from one another by rectangular shaped magnetic inserts of low carbon steel 26. Each of the magnets 24 and inserts 26 has formed in each end thereof a semi-circular cutout such as that indicated at 28 in Fig. 3. The pack assembly is held rigidly together by means of two bolts 30, 32 which are projected along the length of the pack through cutouts 28, and are threaded at their right hand ends as shown in Fig. 1 to an end plate 34 of the magnet pack. The arrangement of the cutouts 28 and the bolts 30, 32 is such as to permit each magnet and associated magnetic insert to be extended the full width of the magnet pack to bring as much flux as possible to the edges of the chuck holding surface provided by the plate assembly 16.

The magnet pack generally designated at 40 is shifted manually between the magnetic holding position of Figs. 1 and 6 and a release position specifically shown in Fig. 5 by means of a hand lever 42 secured to a short rock shaft 44 and mounted in a bearing in the casting 14 and at its inner end provided with an offset driving pin 46. A link 48 pivotally connected at one end by means of a pivot pin with the bracket 34 of the magnet pack and at its other end connected with the offset pin 46, acts upon the rocking of lever 42 to carry the magnet pack from one to the other end of said work holding and release positions. As best shown in Fig. 6 the magnet pack 10 is mounted to slide on a non-magnetic plate 54 which may preferably be made of brass.

A feature of the invention consists in the novel construction of the magnet pack including the permanent magnets and associated magnetic inserts, and a corresponding arrangement of the spaced pole pieces of the work holding plate to provide a relatively large number of magnetic circuits, each of which has a small dimension considered longitudinally of the chuck to provide a fine mesh chuck holding surface with many small flux circuits which nevertheless in the aggregate produce a very substantial holding force.

The magnet pack 40 is made up of a series of ceramic permanent magnets 24, each of which is 3/32" in thickness and with the further dimensions of 11/16" in depth and 4" in length to correspond substantially with the depth and width dimensions of the magnet pack. Interposed between each of the magnets is a magnetic insert of soft carbon steel which is shown as 3/16" wide, 3/4" deep, and 4" long. The individual magnets 24 are magnetized across the narrow dimension and the magnets are inserted in such a way that the adjacent faces of adjoining magnets 24 separated by the magnetic inserts 26 are of the same polarity. In this form of the device a very large cross sectional area of the magnet is made available for the transmission of magnetic flux which passes from each of the two adjacent magnets into the magnetic insert 26, and thence upwardly to the work supporting table of the chuck. For the On position of the chuck the magnetic flux passes upwardly through an overlying pole piece 18 through a work piece 70 shown for example in Fig. 6, and then downwardly through the next adjoining pole pieces 18 and magnetic inserts 26 to the oppositely polarized faces of the respective magnets. For the Off position of the chuck shown in Fig. 5, the magnetic flux passes upwardly through the magnetic insert 26 into the overlapping pole pieces 18 and is then shunted again downwardly through the next adjacent pole pieces 26 to the oppositely polarized faces of the respective magnets.

For use in carrying out the present invention a ceramic permanent magnet material has been selected which may for example have the chemical composition $BaFe_{12}O_{19}$ and is characterized by a high coercivity. Magnets made from this material can withstand extremely high de-magnetizing forces without loss of strength, and are further characterized by extremely short magnetic lengths and by the necessity for unusually large cross sectional areas to offset the relatively low degree of magnetization achieved with the optimum magnet length.

The novel organization of the magnet pack and associated work holding table above described and illustrated has been found to provide a fine mesh chuck of optimum efficiency. It will be noted that the magnets, being polarized across their narrow dimension provide a very substantial cross sectional magnet area through which a flux generated by the magnet can pass. The positioning of the magnets with their like poles in adjacent relation provides for a maximum flow of flux upwardly through the magnetic inserts 26. It will be understood that the magnetic inserts of low carbon steel are capable of carrying a far greater flux load than the magnets per unit of cross sectional area.

The characteristically low level of magnetization of the ceramic permanent magnets shown is fully offset by the permanence of the magnetization which enables the magnets to be placed with their like poles in adjacent relation without loss of strength, and also by the characteristic shape of the magnet employed which takes the form of a flat slab magnetized across its narrow dimension thus providing very large flux generating cross sectional areas adapted for generating a maximum number of lines of force within the relatively narrow space allotted lengthwise of the chuck to each successive magnet assembly.

It will be understood that while the dimensions of the chuck herein disclosed are preferred for holding thin work pieces, other dimensions may be employed in which the general shape of the magnets and their relationship to the intervening magnetic inserts is preserved. There is a further limitation in the fineness of gauge of permanent magnetic chucks which may be produced in accordance with the invention in that the width of the pole pieces 18, magnetic inserts 26 and permanent magnets 24 cannot be reduced to less than 1/8" without incurring a crippling loss of efficiency in the generating of and transmission of lines of force through work held on the chuck.

The invention having been described what is claimed is:

A fine grid permanent magnetic chuck having in combination a chuck body having a work holding plate which comprises a series of flux carrying pole pieces extending through and transversely of said plate, and non-magnetic areas interposed between said pole pieces, said pole pieces and intervening non-magnetic areas being narrowly spaced to form a fine grid holding plate, and a magnet pack housed within said chuck body arranged for engagement with said work holding plate and shiftable longitudinally thereof between work holding and work release position, said magnet pack comprising a series of ceramic permanent magnets characterized by a high coercivity and short magnetic length, said magnets being of substantially rectangular cross section extending transversely of the magnet pack, each of said magnets approximating 3/32" in thickness, 11/16" in depth, and with a lengthwise dimension approximating the width of the chuck table, said magnets being magnetized across said narrow dimension, and alternate magnets being magnetized in opposite directions providing adjacent magnetic faces of like polarity, and magnetic inserts of high flux carrying permeability of a width approximating 3/16" and greater than the width of said intervening non-magnetic areas and with depth and lengthwise dimensions corresponding to the depthwise and widthwise dimensions of the magnet pack, whereby said flux carrying pole pieces will bridge adjacent magnetic inserts for the work release position of said magnet pack.

References Cited in the file of this patent

UNITED STATES PATENTS

| | | |
|---|---|---|
| 2,269,149 | Edgar | Jan. 6, 1942 |
| 2,609,430 | Bower | Sept. 2, 1952 |
| 2,678,729 | Spodig | May 18, 1954 |
| 2,795,740 | Bohli et al. | June 11, 1957 |

FOREIGN PATENTS

| | | |
|---|---|---|
| 174,515 | Austria | Apr. 10, 1953 |
| 1,086,496 | France | Feb. 14, 1955 |